United States Patent
Knutsson et al.

(10) Patent No.: US 12,464,258 B2
(45) Date of Patent: Nov. 4, 2025

(54) IMAGE SENSOR WITH RED-CLEAR-CLEAR-GREEN (RCCG) COLOR FILTER ARRAY (CFA) FOR VEHICLE SENSING APPLICATIONS

(71) Applicant: Qualcomm Auto LTD.

(72) Inventors: Per Knutsson, Linkoping (SE); Henrik Eliasson, Blentarp (SE); Leif Lindgren, Linkoping (SE)

(73) Assignee: Qualcomm Auto Ltd., San Diego, CA (US)

( * ) Notice: Subject to any disclaimer, the term of this patent is extended or adjusted under 35 U.S.C. 154(b) by 0 days.

(21) Appl. No.: 17/930,596

(22) Filed: Sep. 8, 2022

(65) Prior Publication Data

US 2024/0089618 A1    Mar. 14, 2024

(51) Int. Cl.
| | |
|---|---|
| *H04N 25/133* | (2023.01) |
| *H04N 9/64* | (2023.01) |
| *H04N 23/84* | (2023.01) |
| *H04N 25/11* | (2023.01) |
| *H04N 25/13* | (2023.01) |

(52) U.S. Cl.
CPC .......... *H04N 25/133* (2023.01); *H04N 9/64* (2013.01); *H04N 23/84* (2023.01); *H04N 23/843* (2023.01); *H04N 25/11* (2023.01); *H04N 25/134* (2023.01); *H04N 25/135* (2023.01)

(58) Field of Classification Search
CPC .... H04N 25/133; H04N 23/84; H04N 23/843; H04N 9/64
See application file for complete search history.

(56) References Cited

U.S. PATENT DOCUMENTS

| | | | | |
|---|---|---|---|---|
| 8,013,928 | B2* | 9/2011 | Egawa | H01L 27/14623 348/294 |
| 9,736,447 | B2* | 8/2017 | Hirota | G02B 13/0015 |
| 11,025,869 | B2* | 6/2021 | Kwag | H04N 23/843 |

(Continued)

FOREIGN PATENT DOCUMENTS

| | | | | |
|---|---|---|---|---|
| CN | 111383181 A | * | 7/2020 | G06T 5/73 |
| CN | 112308799 A | | 2/2021 | |
| WO | WO-2022261550 A1 | * | 12/2022 | |

OTHER PUBLICATIONS

Navitar, Inc., "Pixelink Knowledge Base" (2018â2019) https://support.pixelink.com/support/solutions (Year: 2019).*

(Continued)

*Primary Examiner* — David N Werner
(74) *Attorney, Agent, or Firm* — Norton Rose Fulbright US LLP

(57) ABSTRACT

This disclosure provides systems, methods, and devices for vehicle driving assistance systems that support image processing for vehicular monitoring operations. In a first aspect, a method of image processing includes receiving image data from an image sensor comprising a red-clear-clear-green (RCCG) color filter, wherein the image data comprises a first channel corresponding to red, a second channel corresponding to clear, and a third channel corresponding to green, wherein the image data is in a logarithmic domain; and processing the image data by performing operations including linearization, tone mapping, demosaicing, and color mapping. Other aspects and features are also claimed and described.

17 Claims, 7 Drawing Sheets

(56) References Cited

U.S. PATENT DOCUMENTS

| | | | |
|---|---|---|---|
| 2008/0068477 A1* | 3/2008 | Iida | H04N 25/133 348/E3.016 |
| 2009/0021810 A1* | 1/2009 | Adams, Jr. | H04N 25/135 358/525 |
| 2010/0092082 A1* | 4/2010 | Hirakawa | G06T 3/4015 382/167 |
| 2010/0195908 A1 | 8/2010 | Bechtel et al. | |
| 2010/0258633 A1* | 10/2010 | Wang | G06K 7/10722 235/472.01 |
| 2011/0205381 A1* | 8/2011 | Vranceanu | H04N 25/133 348/217.1 |
| 2011/0285881 A1* | 11/2011 | Izuha | H01L 27/14621 257/432 |
| 2013/0083157 A1* | 4/2013 | Kamon | H04N 25/135 348/33 |
| 2013/0208117 A1* | 8/2013 | Kamon | H04N 25/131 348/148 |
| 2013/0242148 A1* | 9/2013 | Mlinar | G06T 5/10 348/279 |
| 2013/0322745 A1* | 12/2013 | Lim | H04N 23/88 382/162 |
| 2015/0172618 A1* | 6/2015 | Takahashi | H04N 9/68 348/164 |
| 2016/0173793 A1* | 6/2016 | Mitsunaga | H04N 25/583 348/229.1 |
| 2019/0075263 A1 | 3/2019 | Mlinar et al. | |
| 2023/0232122 A1* | 7/2023 | Swami | H04N 9/67 348/222.1 |

OTHER PUBLICATIONS

H.S. Malvar, L.W. He, & R. Cutler, "High-Quality Linear Interpolation for Demosaicing of Bayer-Patterned Color Images", 3 2004 IEEE Int'l Conf. on Acoustics, Speech, & Signal Processing 485-488 (May 2004) (Year: 2004).*

Funatsu E., et al., "Non-RGB Color Filter Options and Traffic Signal Detection Capabilities", IS&T International Symposium on Electronic Imaging 2022, Autonomous Vehicles and Machines 2022, https://doi.org/10.2352/EI.2022.34.16.AVM-215, Society for Imaging Science and Technology, 6 Pages.

International Search Report and Written Opinion—PCT/EP2023/070358—ISA/EPO—Oct. 30, 2023.

* cited by examiner

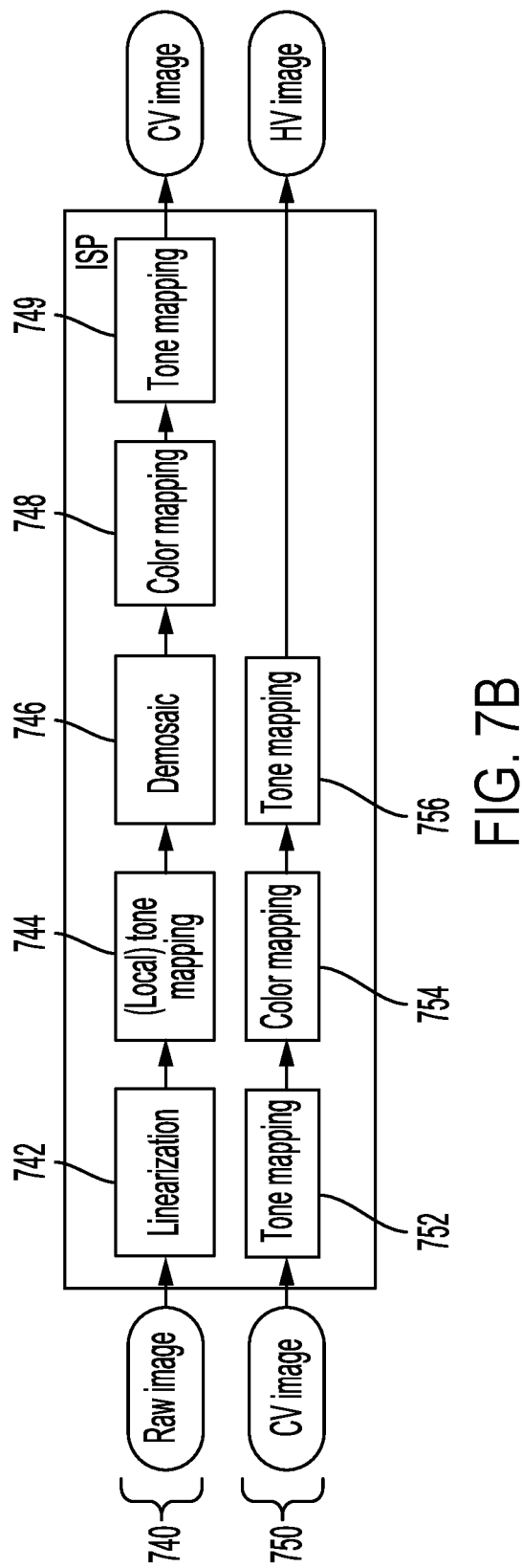
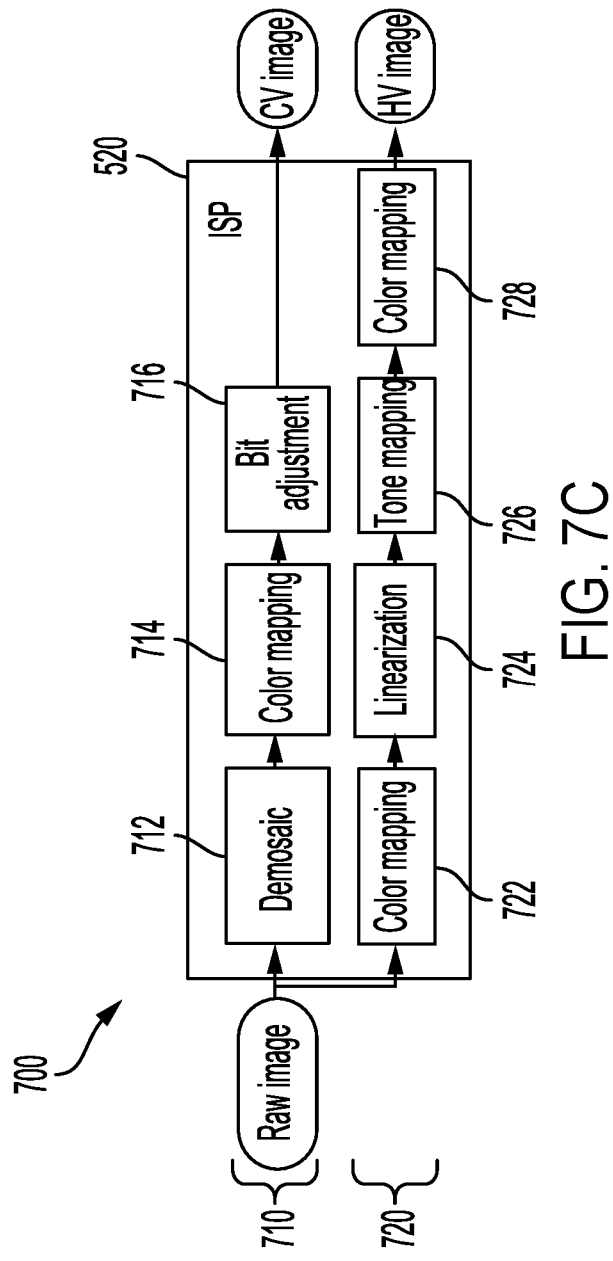
FIG. 7B
FIG. 7C

IMAGE SENSOR WITH RED-CLEAR-CLEAR-GREEN (RCCG) COLOR FILTER ARRAY (CFA) FOR VEHICLE SENSING APPLICATIONS

TECHNICAL FIELD

Aspects of the present disclosure relate generally to driver-operated vehicles, and more particularly, to methods and systems suitable for supplying driving assistance or for autonomous driving.

INTRODUCTION

Vehicles take many shapes and sizes, are propelled by a variety of propulsion techniques, and carry cargo including humans, animals, or objects. These machines have enabled the movement of cargo across long distances, movement of cargo at high speed, and movement of cargo that is larger than could be moved by human exertion. Vehicles originally were driven by humans to control speed and direction of the cargo to arrive at a destination. Human operation of vehicles has led to many unfortunate incidents resulting from the collision of vehicle with vehicle, vehicle with object, vehicle with human, or vehicle with animal. As research into vehicle automation has progressed, a variety of driving assistance systems have been produced and introduced. These include navigation directions by GPS, adaptive cruise control, lane change assistance, collision avoidance systems, night vision, parking assistance, and blind spot detection.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Human operators of vehicles can be distracted, which is one factor in many vehicle crashes. Driver distractions can include changing the radio, observing an event outside the vehicle, and using an electronic device, etc. Sometimes circumstances create situations that even attentive drivers are unable to identify in time to prevent vehicular collisions. Aspects of this disclosure, provide improved systems for assisting drivers in vehicles with enhanced situational awareness when driving on a road.

Example embodiments provide driver behavior monitoring systems and methods capable of detecting inattentive behavior by the driver, whether that inattentive behavior is the result of a distraction or untrained vehicle operation. Driver behavior analysis results may be combined with other vehicle sensor information (e.g., engine information, speed sensors, location information, etc.) to determine the occurrence and location of an accident, a near-miss of an accident, and/or score a vehicle operator's performance. The system may report an accident to authorities, emergency responders or the other drivers nearby by leveraging global positioning system (GPS) information and/or wireless multicasting techniques based on the location of the car.

In some embodiments, a red-clear-clear-green (RCCG) color filter array (CFA) may be included in a camera module of a vehicle system to improve the operation of a vehicle processing system for processing image data from surroundings of the vehicle and used in the example applications described above. The RCCG CFA may have improved performance in vehicle applications, such as improved sensitivity, signal-to-noise ratio (SNR) and/or yellow-red discrimination, each of which may improve accuracy of detecting traffic signs and traffic lights among other features.

In one aspect of the disclosure, a method for vehicle monitoring includes receiving image data from an image sensor comprising a red-clear-clear-green (RCCG) color filter, wherein the image data comprises a first channel corresponding to red, a second channel corresponding to clear, and a third channel corresponding to green, wherein the image data is in a logarithmic domain; and processing the image data by performing operations including linearization, tone mapping, demosaicing, and color mapping.

In an additional aspect of the disclosure, an apparatus includes at least one processor and a memory coupled to the at least one processor. The at least one processor is configured to perform operations including receiving image data from an image sensor comprising a red-clear-clear-green (RCCG) color filter, wherein the image data comprises a first channel corresponding to red, a second channel corresponding to clear, and a third channel corresponding to green, wherein the image data is in a logarithmic domain; and processing the image data by performing operations including linearization, tone mapping, demosaicing, and color mapping.

In an additional aspect of the disclosure, an apparatus includes means for receiving image data from an image sensor comprising a red-clear-clear-green (RCCG) color filter, wherein the image data comprises a first channel corresponding to red, a second channel corresponding to clear, and a third channel corresponding to green, wherein the image data is in a logarithmic domain; and means for processing the image data by performing operations including linearization, tone mapping, demosaicing, and color mapping.

In an additional aspect of the disclosure, a non-transitory computer-readable medium stores instructions that, when executed by a processor, cause the processor to perform operations. The operations include receiving image data from an image sensor comprising a red-clear-clear-green (RCCG) color filter, wherein the image data comprises a first channel corresponding to red, a second channel corresponding to clear, and a third channel corresponding to green, wherein the image data is in a logarithmic domain; and processing the image data by performing operations including linearization, tone mapping, demosaicing, and color mapping.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) ng networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). 5G networks include diverse deployments, diverse spectrum, and diverse services and devices that may be implemented using an OFDM-based unified, air interface.

The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band. 5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur.

Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination.

Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

Also, as used herein, the term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

Also, as used herein, relative terms, unless otherwise specified, may be understood to be relative to a reference by a certain amount. For example, terms such as "higher" or "lower" or "more" or "less" may be understood as higher, lower, more, or less than a reference value by a threshold amount.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 7B is a block diagram illustrating an image signal processing system according to one or more aspects of the disclosure.

FIG. 7C is a block diagram illustrating an image signal processing system according to one or more aspects of the disclosure.

Like reference numbers and designations in the various drawings indicate like elements.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support capturing image data through a red-clear-clear-green (RCCG) color filter array (CFA) with an image sensor configured in a logarithmic domain; and processing the RCCG image data, with at least a portion of the processing being performed in the logarithmic domain.

Particular implementations of the subject matter described in this disclosure may be implemented to realize one or more of the following potential advantages or benefits. In some aspects, the present disclosure provides techniques for image processing that may be particularly beneficial in smart vehicle applications. For example, the RCCG color filter array may provide a trichromatic color response similar to that of human vision, an improved signal-to-noise ratio (SNR) in the broadband luminance channel, increased dynamic range with consistent color reproduction, spectral eigenmodes of the system that are similar to the opponent colors used in the human vision sense, and/or an increased level of color discrimination of objects in the yellow-orange spectral range. Discrimination in the yellow-orange space is of particular importance in traffic environments because many lane markings, traffic signals, and traffic lights use orange and yellow colors.

Figure 1:
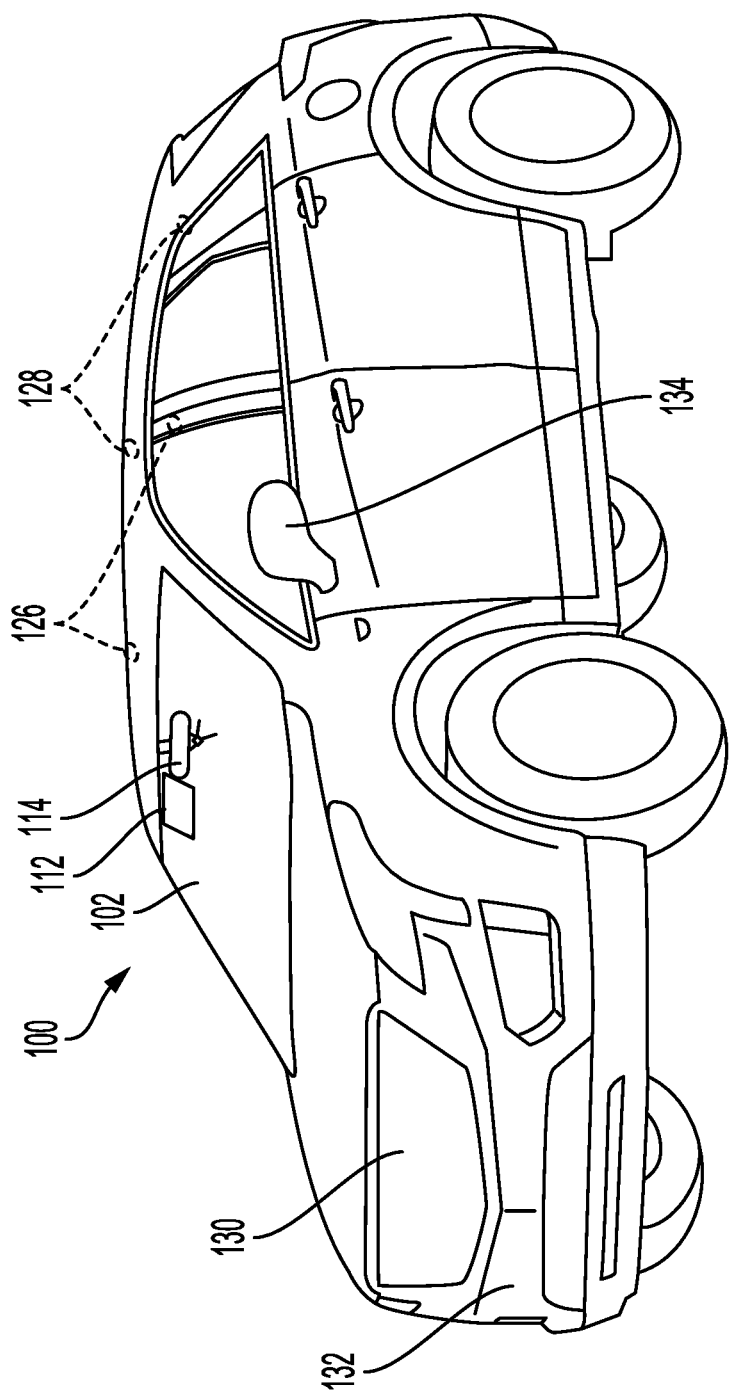
FIG. 1 is a perspective view of a motor vehicle with a driver monitoring system according to embodiments of this disclosure.

FIG. 1 is a perspective view of a motor vehicle with a driver monitoring system according to embodiments of this disclosure. A vehicle 100 may include a front-facing camera 112 mounted inside the cabin looking through the windshield 102. The vehicle may also include a cabin-facing camera 114 mounted inside the cabin looking towards occupants of the vehicle 100, and in particular the driver of the vehicle 100. Although one set of mounting positions for cameras 112 and 114 are shown for vehicle 100, other mounting locations may be used for the cameras 112 and 114. For example, one or more cameras may be mounted on one of the driver or passenger B pillars 126 or one of the driver or passenger C pillars 128, such as near the top of the pillars 126 or 128. As another example, one or more cameras may be mounted at the front of vehicle 100, such as behind the radiator grill 130 or integrated with bumper 132. As a further example, one or more cameras may be mounted as part of a driver or passenger side mirror assembly 134.

The camera 112 may be oriented such that the field of view of camera 112 captures a scene in front of the vehicle 100 in the direction that the vehicle 100 is moving when in drive mode or forward direction. In some embodiments, an additional camera may be located at the rear of the vehicle 100 and oriented such that the field of view of the additional camera captures a scene behind the vehicle 100 in the direction that the vehicle 100 is moving when in reverse direction. Although embodiments of the disclosure may be described with reference to a "front-facing" camera, referring to camera 112, aspects of the disclosure may be applied similarly to a "rear-facing" camera facing in the reverse direction of the vehicle 100. Thus, the benefits obtained while the operator is driving the vehicle 100 in a forward direction may likewise be obtained while the operator is driving the vehicle 100 in a reverse direction.

Further, although embodiments of the disclosure may be described with reference a "front-facing" camera, referring to camera 112, aspects of the disclosure may be applied similarly to an input received from an array of cameras mounted around the vehicle 100 to provide a larger field of view, which may be as large as 360 degrees around parallel to the ground and/or as large as 360 degrees around a vertical direction perpendicular to the ground. For example, additional cameras may be mounted around the outside of vehicle 100, such as on or integrated in the doors, on or integrated in the wheels, on or integrated in the bumpers, on or integrated in the hood, and/or on or integrated in the roof.

The camera 114 may be oriented such that the field of view of camera 114 captures a scene in the cabin of the vehicle and includes the user operator of the vehicle, and in particular the face of the user operator of the vehicle with sufficient detail to discern a gaze direction of the user operator.

Each of the cameras 112 and 114 may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a telephoto image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur in a camera module with a lens cluster, in which the multiple image sensors and associated lenses are located in offset locations within the camera module. Additional image sensors may be included with larger, smaller, or same fields of view.

Each image sensor may include means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), and/or time of flight detectors. The apparatus may further include one or more means for accumulating and/or focusing light rays into the one or more image sensors (including simple lenses, compound lenses, spherical lenses, and non-spherical lenses). These components may be controlled to capture the first, second, and/or more image frames. The image frames may be processed to form a single output image frame, such as through a fusion operation, and that output image frame further processed according to the aspects described herein.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

Figure 2:
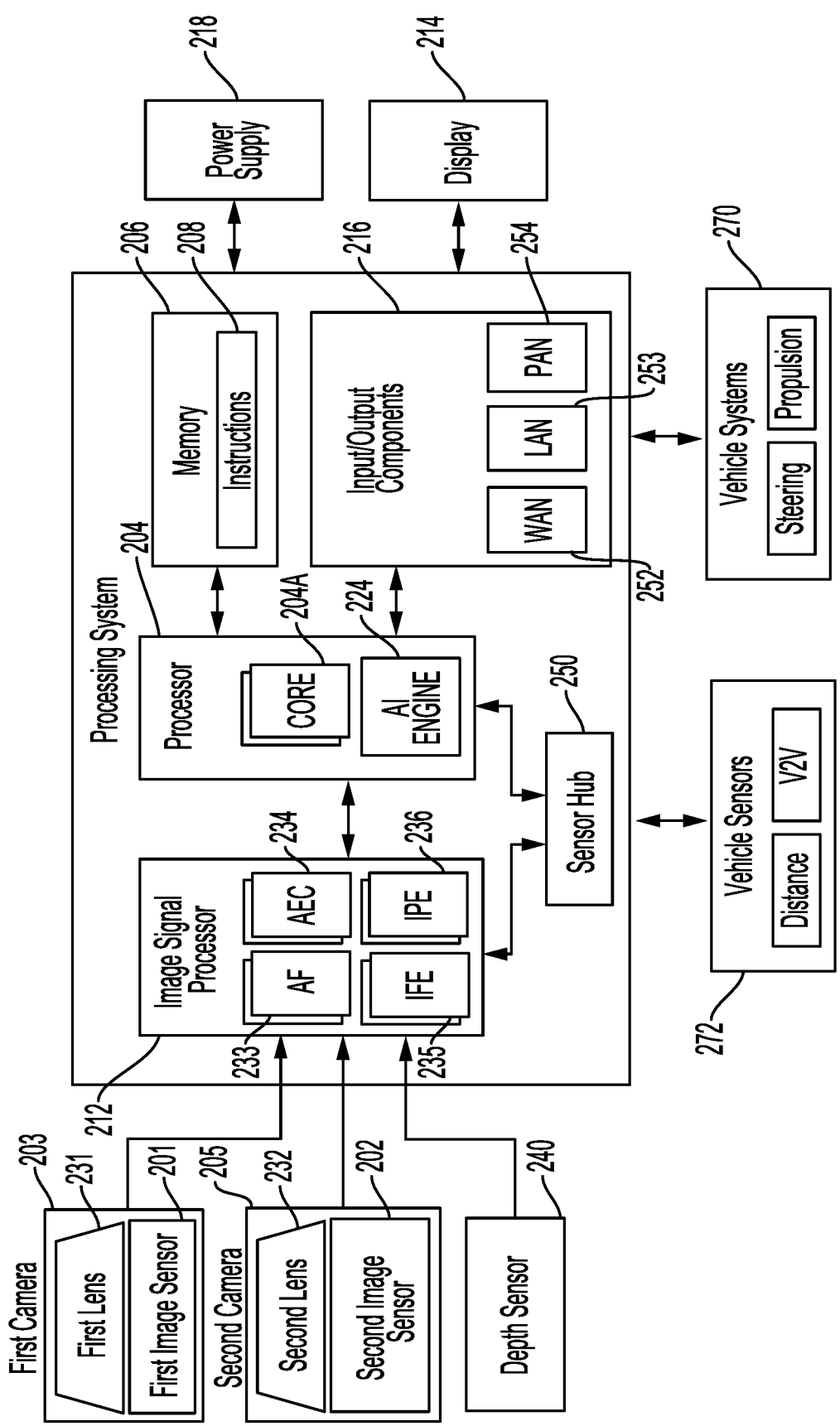
FIG. 2 shows a block diagram of an example image processing configuration for a vehicle according to one or more aspects of the disclosure.

FIG. 2 shows a block diagram of an example image processing configuration for a vehicle according to one or more aspects of the disclosure. The vehicle 100 may include, or otherwise be coupled to, an image signal processor 212 for processing image frames from one or more image sensors, such as a first image sensor 201, a second image sensor 202, and a depth sensor 240. In some implementations, the vehicle 100 also includes or is coupled to a processor (e.g., CPU) 204 and a memory 206 storing instructions 208. The device 100 may also include or be coupled to a display 214 and input/output (I/O) components 216. I/O components 216 may be used for interacting with a user, such as a touch screen interface and/or physical buttons. I/O components 216 may also include network interfaces for communicating with other devices, such as other vehicles, an operator's mobile devices, and/or a remote monitoring system. The network interfaces may include one or more of a wide area network (WAN) adaptor 252, a local area network (LAN) adaptor 253, and/or a personal area network (PAN) adaptor 254. An example WAN adaptor 252 is a 4G LTE or a 5G NR wireless network adaptor. An example LAN adaptor 253 is an IEEE 802.11 WiFi wireless network adapter. An example PAN adaptor 254 is a Bluetooth wireless network adaptor. Each of the adaptors 252, 253, and/or 254 may be coupled to an antenna, including multiple antennas configured for primary and diversity reception and/or configured for receiving specific frequency bands.

The vehicle 100 may further include or be coupled to a power supply 218, such as a battery or an alternator. The vehicle 100 may also include or be coupled to additional features or components that are not shown in FIG. 2. In one example, a wireless interface, which may include one or more transceivers and associated baseband processors, may be coupled to or included in WAN adaptor 252 for a wireless communication device. In a further example, an analog front end (AFE) to convert analog image frame data to digital image frame data may be coupled between the image sensors 201 and 202 and the image signal processor 212.

The vehicle 100 may include a sensor hub 250 for interfacing with sensors to receive data regarding movement of the vehicle 100, data regarding an environment around the vehicle 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In further examples, a non-camera sensor may be a global positioning system (GPS) receiver, a light detection and ranging (LiDAR) system, a radio detection and ranging (RADAR) system, or other ranging systems. For example, the sensor hub 250 may interface to a vehicle bus for sending configuration commands and/or receiving information from vehicle sensors 272, such as distance (e.g., ranging) sensors or vehicle-to-vehicle (V2V) sensors (e.g., sensors for receiving information from nearby vehicles).

The image signal processor (ISP) 212 may receive image data, such as used to form image frames. In one embodiment, a local bus connection couples the image signal processor 212 to image sensors 201 and 202 of a first camera 203, which may correspond to camera 112 of FIG. 1, and second camera 205, which may correspond to camera 114 of FIG. 1, respectively. In another embodiment, a wire interface may couple the image signal processor 212 to an external image sensor. In a further embodiment, a wireless interface may couple the image signal processor 212 to the image sensor 201, 202.

The first camera 203 may include the first image sensor 201 and a corresponding first lens 231. The second camera 205 may include the second image sensor 202 and a corresponding second lens 232. Each of the lenses 231 and 232 may be controlled by an associated autofocus (AF) algorithm 233 executing in the ISP 212, which adjust the lenses 231 and 232 to focus on a particular focal plane at a certain scene depth from the image sensors 201 and 202. The AF algorithm 233 may be assisted by depth sensor 240. In some embodiments, the lenses 231 and 232 may have a fixed focus.

The first image sensor 201 and the second image sensor 202 are configured to capture one or more image frames. Lenses 231 and 232 focus light at the image sensors 201 and 202, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging.

In some embodiments, the image signal processor 212 may execute instructions from a memory, such as instructions 208 from the memory 206, instructions stored in a separate memory coupled to or included in the image signal processor 212, or instructions provided by the processor 204. In addition, or in the alternative, the image signal processor 212 may include specific hardware (such as one or more integrated circuits (ICs)) configured to perform one or more operations described in the present disclosure. For example, the image signal processor 212 may include one or more image front ends (IFEs) 235, one or more image post-processing engines (IPEs) 236, and or one or more auto exposure compensation (AEC) 234 engines. The AF 233, AEC 234, IFE 235, IPE 236 may each include application-specific circuitry, be embodied as software code executed by the ISP 212, and/or a combination of hardware within and software code executing on the ISP 212.

In some implementations, the memory 206 may include a non-transient or non-transitory computer readable medium storing computer-executable instructions 208 to perform all or a portion of one or more operations described in this disclosure. In some implementations, the instructions 208 include a camera application (or other suitable application) to be executed during operation of the vehicle 100 for generating images or videos. The instructions 208 may also include other applications or programs executed for the vehicle 100, such as an operating system, mapping applications, or entertainment applications. Execution of the camera application, such as by the processor 204, may cause the vehicle 100 to generate images using the image sensors 201 and 202 and the image signal processor 212. The memory 206 may also be accessed by the image signal processor 212 to store processed frames or may be accessed by the processor 204 to obtain the processed frames. In some embodiments, the vehicle 100 includes a system on chip (SoC) that incorporates the image signal processor 212, the processor 204, the sensor hub 250, the memory 206, and input/output components 216 into a single package.

In some embodiments, at least one of the image signal processor 212 or the processor 204 executes instructions to perform various operations described herein, including object detection, risk map generation, driver monitoring, and driver alert operations. For example, execution of the instructions can instruct the image signal processor 212 to begin or end capturing an image frame or a sequence of image frames. In some embodiments, the processor 204 may include one or more general-purpose processor cores 204A capable of executing scripts or instructions of one or more software programs, such as instructions 208 stored within the memory 206. For example, the processor 204 may include one or more application processors configured to execute the camera application (or other suitable application for generating images or video) stored in the memory 206.

In executing the camera application, the processor 204 may be configured to instruct the image signal processor 212 to perform one or more operations with reference to the image sensors 201 or 202. For example, the camera application may receive a command to begin a video preview display upon which a video comprising a sequence of image frames is captured and processed from one or more image sensors 201 or 202 and displayed on an informational display on display 114 in the cabin of the vehicle 100.

In some embodiments, the processor 204 may include ICs or other hardware (e.g., an artificial intelligence (AI) engine 224) in addition to the ability to execute software to cause the vehicle 100 to perform a number of functions or operations, such as the operations described herein. In some other embodiments, the vehicle 100 does not include the processor 204, such as when all of the described functionality is configured in the image signal processor 212.

In some embodiments, the display 214 may include one or more suitable displays or screens allowing for user interaction and/or to present items to the user, such as a preview of the image frames being captured by the image sensors 201 and 202. In some embodiments, the display 214 is a touch-sensitive display. The I/O components 216 may be or include any suitable mechanism, interface, or device to receive input (such as commands) from the user and to provide output to the user through the display 214. For example, the I/O components 216 may include (but are not limited to) a graphical user interface (GUI), a keyboard, a mouse, a microphone, speakers, a squeezable bezel, one or more buttons (such as a power button), a slider, a switch, and so on. In some embodiments involving autonomous driving, the I/O components 216 may include an interface to a vehicle's bus for providing commands and information to and receiving information from vehicle systems 270 including propulsion (e.g., commands to increase or decrease speed or apply brakes) and steering systems (e.g., commands to turn wheels, change a route, or change a final destination).

While shown to be coupled to each other via the processor 204, components (such as the processor 204, the memory 206, the image signal processor 212, the display 214, and the I/O components 216) may be coupled to each another in other various arrangements, such as via one or more local buses, which are not shown for simplicity. While the image signal processor 212 is illustrated as separate from the processor 204, the image signal processor 212 may be a core of a processor 204 that is an application processor unit (APU), included in a system on chip (SoC), or otherwise included with the processor 204. While the vehicle 100 is referred to in the examples herein for including aspects of the present disclosure, some device components may not be shown in FIG. 2 to prevent obscuring aspects of the present disclosure. Additionally, other components, numbers of components, or combinations of components may be included in a suitable vehicle for performing aspects of the present disclosure. As such, the present disclosure is not limited to a specific device or configuration of components, including the vehicle 100.

Figure 3:
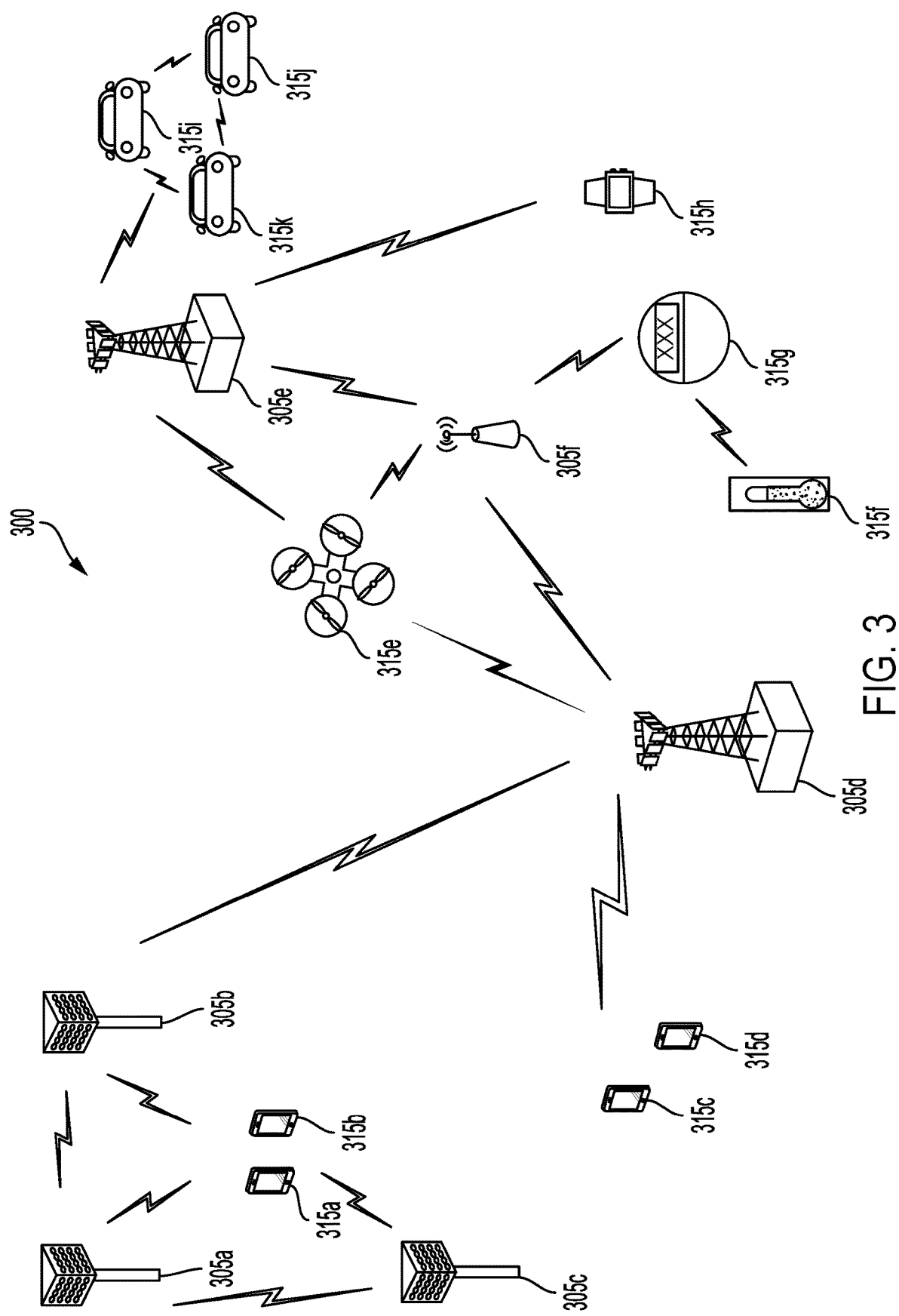
FIG. 3 is a block diagram illustrating details of an example wireless communication system according to one or more aspects.

The vehicle 100 may communicate as a user equipment (UE) within a wireless network 300, such as through WAN adaptor 252, as shown in FIG. 3. FIG. 3 is a block diagram illustrating details of an example wireless communication system according to one or more aspects. Wireless network 300 may, for example, include a 5G wireless network. As appreciated by those skilled in the art, components appearing in FIG. 3 are likely to have related counterparts in other network arrangements including, for example, cellular-style network arrangements and non-cellular-style-network arrangements (e.g., device-to-device or peer-to-peer or ad-hoc network arrangements, etc.).

Wireless network 300 illustrated in FIG. 3 includes base stations 305 and other network entities. A base station may be a station that communicates with the UEs and may also be referred to as an evolved node B (eNB), a next generation eNB (gNB), an access point, and the like. Each base station 305 may provide communication coverage for a particular geographic area. In 3GPP, the term "cell" may refer to this particular geographic coverage area of a base station or a base station subsystem serving the coverage area, depending on the context in which the term is used. In implementations of wireless network 300 herein, base stations 305 may be associated with a same operator or different operators (e.g., wireless network 300 may include a plurality of operator wireless networks). Additionally, in implementations of wireless network 300 herein, base station 305 may provide wireless communications using one or more of the same frequencies (e.g., one or more frequency bands in licensed spectrum, unlicensed spectrum, or a combination thereof) as a neighboring cell. In some examples, an individual base station 305 or UE 315 may be operated by more than one network operating entity. In some other examples, each base station 305 and UE 315 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 3, base stations 305$d$ and 305$e$ are regular macro base stations, while base stations 305$a$-305$c$ are macro base stations enabled with one of three-dimension (3D), full dimension (FD), or massive MIMO. Base stations 305$a$-305$c$ take advantage of their higher dimension MIMO capabilities to exploit 3D beamforming in both elevation and azimuth beamforming to increase coverage and capacity. Base station 305$f$ is a small cell base station which may be a home node or portable access point. A base station may support one or multiple (e.g., two, three, four, and the like) cells.

Wireless network 300 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 315 are dispersed throughout the wireless network 300, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology.

Some non-limiting examples of a mobile apparatus, such as may include implementations of one or more of UEs 315, include a mobile, a cellular (cell) phone, a smart phone, a session initiation protocol (SIP) phone, a wireless local loop (WLL) station, a laptop, a personal computer (PC), a notebook, a netbook, a smart book, a tablet, a personal digital assistant (PDA), and a vehicle. Although UEs 315$a$-$j$ are specifically shown as vehicles, a vehicle may employ the communication configuration described with reference to any of the UEs 315$a$-315$k$.

In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 315$a$-315$d$ of the implementation illustrated in FIG. 3 are examples of mobile smart phone-type devices accessing wireless network 300. A UE may also be a machine specifically configured for connected communication, including machine type communication (MTC), enhanced MTC (eMTC), narrowband IoT (NB-IoT) and the like. UEs 315$e$-315$k$ illustrated in FIG. 3 are examples of various machines configured for communication that access wireless network 300.

A mobile apparatus, such as UEs 315, may be able to communicate with any type of the base stations, whether macro base stations, pico base stations, femto base stations, relays, and the like. In FIG. 3, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 300 may occur using wired or wireless communication links.

In operation at wireless network 300, base stations 305$a$-305$c$ serve UEs 315$a$ and 315$b$ using 3D beamforming and coordinated spatial techniques, such as coordinated multi-point (CoMP) or multi-connectivity. Macro base station 305$d$ performs backhaul communications with base stations 305$a$-305$c$, as well as small cell, base station 305$f$. Macro base station 305$d$ also transmits multicast services which are subscribed to and received by UEs 315$c$ and 315$d$. Such multicast services may include mobile television or stream video, or may include other services for providing community information, such as weather emergencies or alerts, such as Amber alerts or gray alerts.

Wireless network 300 of implementations supports mission critical communications with ultra-reliable and redundant links for mission critical devices, such UE 315$e$. Redundant communication links with UE 315$e$ include from macro base stations 305$d$ and 305$e$, as well as small cell base station 305$f$. Other machine type devices, such as UE 315$f$ (thermometer), UE 315$g$ (smart meter), and UE 315$h$ (wearable device) may communicate through wireless network 300 either directly with base stations, such as small cell base station 305$f$, and macro base station 305$e$, or in multi-hop configurations by communicating with another user device which relays its information to the network, such as UE 315$f$ communicating temperature measurement information to the smart meter, UE 315$g$, which is then reported to the network through small cell base station 305$f$. Wireless network 300 may also provide additional network efficiency through dynamic, low-latency TDD communications or low-latency FDD communications, such as in a vehicle-to-vehicle (V2V) mesh network between UEs 315$i$-315$k$ communicating with macro base station 305$e$.

Aspects of the vehicular systems described with reference to, and shown in, FIG. 1, FIG. 2, and FIG. 3 may include camera sensors with color filter arrays (CFAs) and appropriate image processing circuitry. In some embodiments, the image sensor may have a color filter array (CFA) configured to produce a trichromatic color response of the system similar to the human vision sense. For example, the CFA may be a Red-Clear-Clear-Green (RCCG) filter array. Image processing for the RCCG output of the image sensor may include a suitable exposure control and image preprocessing.

RCCG image sensor configurations may provide higher sensitivity in the broadband spectral channel (e.g., luminance), which is important for providing similar color response in day-time and night-time use of the vehicle. Much of the morphological information representative of the vehicle surroundings is mainly carried by this channel. The red (R) and green (G) color channels enhance the luminance information because the color response is similar to a human eye, because many of the objects in the traffic environment have been designed to match the color response of the human eye. The red (R) and green (G) color channels also provide a better representation of the surroundings when the signal is displayed live in the vehicle or for recording, while in combination with the clear channels still provide the useful luminance information.

Figure 4:
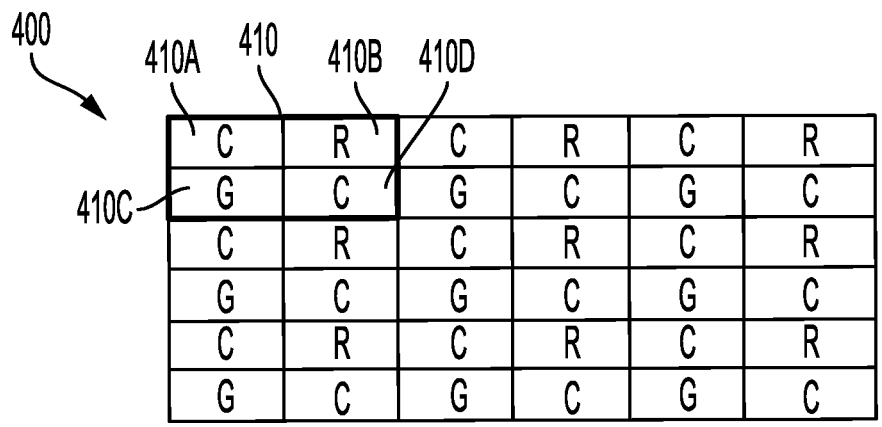
FIG. 4 is a block diagram illustrating a Red-Clear-Clear-Green (RCCG) filter array for an image sensor according to one or more aspects of the disclosure.

FIG. 4 is a block diagram illustrating a Red-Clear-Clear-Green (RCCG) filter array for an image sensor according to one or more aspects of the disclosure. A color filter 400 may include a 4×4 unit cell 410. Although one example is shown as cell 410, the pattern may be shifted in the vertical column or horizontal rows, such as by one row and/or one column. The unit cell is repeated across an array of individual pixel sensors. Each unit cell includes a combination of red, clear, and green filters. In certain embodiments, the unit cell 410 is a RCCG cell, which includes a first clear pixel 410A, a red pixel 410B, a green pixel 410C, and a second clear pixel 410D. The order of the pixels in the unit cell may follow a zig-zag pattern of clear, red, green, and clear, although different arrangements may likewise be used for a RCCG filter array.

Figure 5:
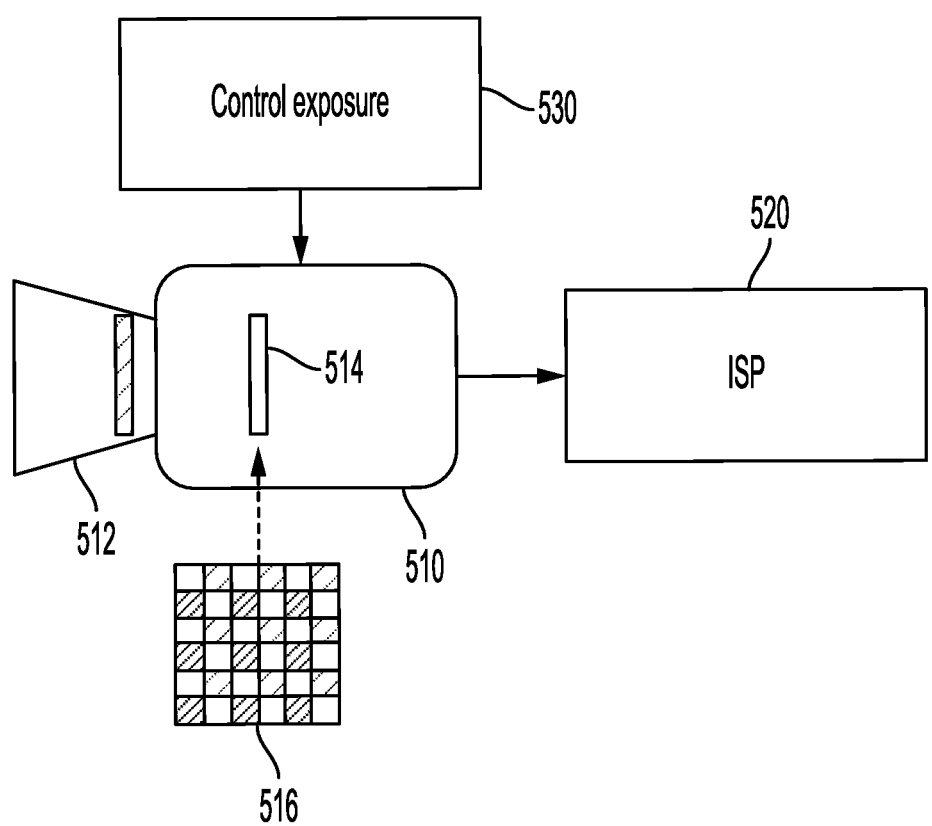
FIG. 5 is a block diagram illustrating a camera system with a RCCG filter array according to one or more aspects of the disclosure.

The color filter array may be included with other components to form a camera module, which may be included in an image processing system. FIG. 5 is a block diagram illustrating a camera system with a RCCG filter array according to one or more aspects of the disclosure. A camera module 510 may include a lens 512, which directs light toward an image sensor 514. The image sensor 514 includes an array of sensor corresponding to individual pixels of image data. Overlaid on the image sensor 514 is a color filter array (CFA) 516, such as a RCCG filter array as shown in FIG. 4. In certain embodiments, the array 516 is a red-green-clear color filter array with the color filters organized in pattern similar to a Bayer color filter array with red at the same position, clear replacing the green, and green replacing the blue color filter positions in the Bayer filter.

The camera module 510 may output image data to an image signal processor (ISP) 520. The ISP may process the raw output of the camera module 510 to form image frames that may be saved, displayed, or transmitted for viewing by a user. The ISP 520 may include a pipeline of logic for performing a series of operations on the image data. In some embodiments, portions of circuitry in the ISP 520 may be reused for different processing tasks in the image processing pipeline.

The image sensor 514 may be operated based on an exposure control 530, such as AEC 234. The control exposure may control settings in the camera module 510 such as gain, exposure time, frame rate, and/or other parameters that change how the image data output from the camera module 510 represent the light captured from the scene at the image sensor 514. For example, the exposure control 530 may increase gain and/or exposure time in dark scenes to increase a brightness of the image data. In certain embodiments, the exposure control 530 may configure the camera module 510 with different gains on the red and green channel in order to reach similar signal strength as present in the clear channel given a spectrally neutral signal input to the system.

In certain embodiments, the lens 512 may be a lens assembly with a specified cut-off filter at longer wavelengths, limiting spectral transmission in near-infrared wavelengths. The lens assembly may function as a bandpass filter. The filter may be tuned to cut off blue light.

Figure 6:
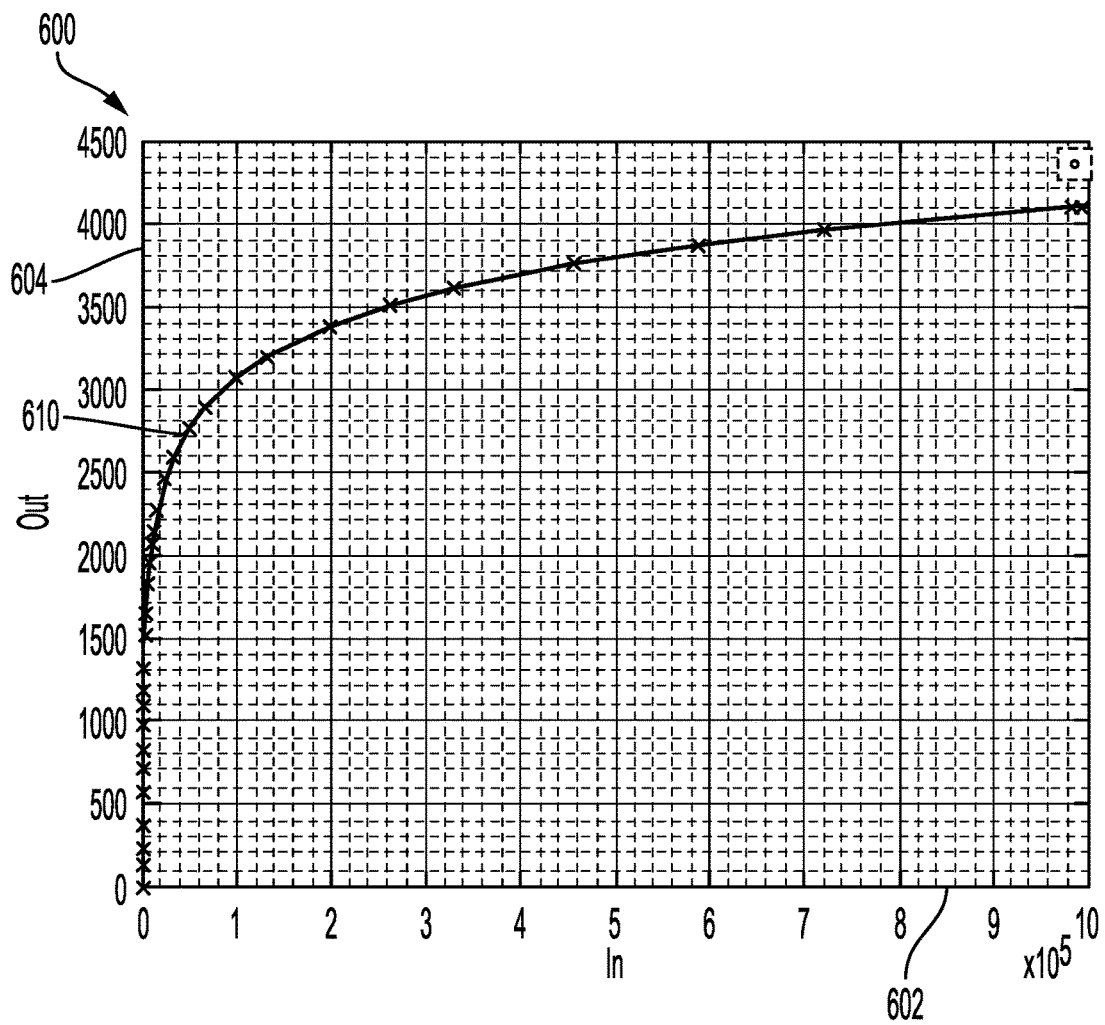
FIG. 6 is a graph showing a logarithmic response in an image sensor according to one or more aspects of the disclosure.

The output of the camera module 510 may be an image signal with a logarithmic response to input light signals at the image sensor 514. An example logarithmic relationship is shown in FIG. 6. FIG. 6 is a graph showing a logarithmic response in an image sensor according to one or more aspects of the disclosure. Graph 600 includes a line 610 showing a relationship between an input light signal on x-axis 602 and an output image sensor signal on y-axis 604. The logarithmic output differs from a linear output relationship in that the logarithmic relationship is more sensitive as low input signal values. The logarithmic relationship may not be strictly logarithmic, but be logarithmic for a portion of a range of inputs with a lowermost end not approximating a logarithmic mapping but rather a linear mapping with certain gain. In certain embodiments, the logarithmic output may be applied to certain channels of the R, G, C channels. For example, linear gain may be applied to the green channel and logarithmic gain may be applied to the clear and red channels.

Operating with a logarithmic response may reduce the amount of data transmitted between the camera module 510 and the ISP 520 to reduce transmission and signaling problems on a bus between the camera module 510 and the ISP 520. For example, in the linear domain a desired level of dynamic range (DR) may require a 20-bit image signal, which would be formatted as 32-bit words for transmission over a bus to the ISP 520. Accommodating a 32-bit wide bus would require additional complexity in packaging of the camera module 510 and the ISP 520, increase a size required for connectors and/or traces on a printed circuit board (PCB), and increase the complexity of ISP 520 to process 32-bit wide signals. Using a logarithmic response, such as shown in FIG. 6, for the output of the camera module 510 may allow obtaining similar dynamic range (DR) with a 12-bit or 16-bit image signal, which may be transmitted over in 16-bit wide words over a connection to the ISP 520.

In certain embodiments, HDR merge may be applied to image data captured by camera module 510 by mapping high linear dynamic range of intensities into logarithmic response. The mapping may include a linear mapping with predefined gain at the very lowest signal range.

The output of the ISP 520 may be used in a variety of driving assistance systems, including navigation, adaptive cruise control, lane change assistance, collision avoidance systems, night vision, parking assistance, and blind spot detection, self-parking, and/or automated drive.

Figure 7A:
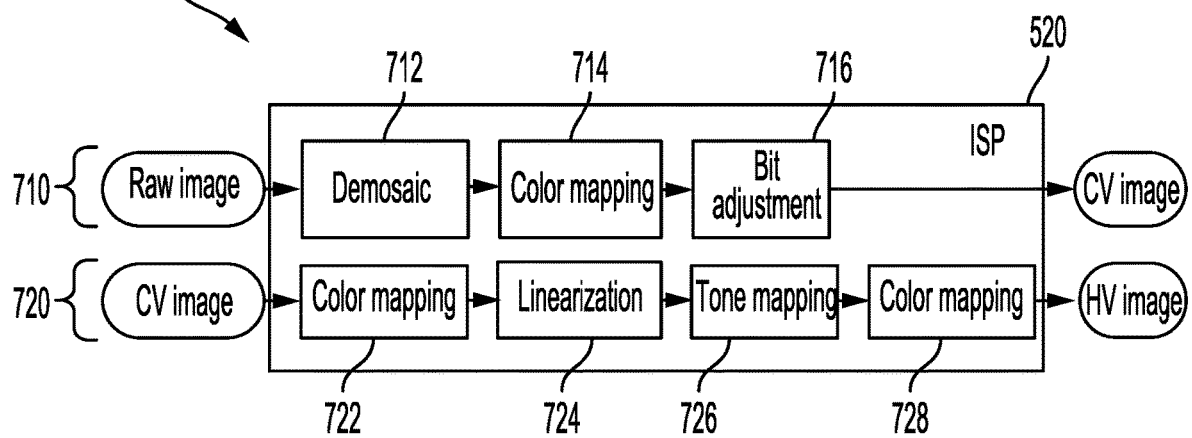
FIG. 7A is a block diagram illustrating an image signal processing system according to one or more aspects of the disclosure.

An example image signal processing chain for the ISP 520 is shown in FIG. 7A. FIG. 7A is a block diagram illustrating an image signal processing system according to one or more aspects of the disclosure. A signal chain 700 may be implemented in an ISP with computer vision (CV) and/or human vision (HV) images. A first portion 710 of the signal chain may execute CV processing by receiving a logarithmic signal response as RAW image input. The first portion 710 may further perform demosaicing 712, color mapping 714 to a new color space according to a specifically-tuned color space, tuning based on recorded data, and/or bit depth adjustment 716 of each channel in the new color space.

The output of the first portion 710 of processing is a computer vision (CV) image that may be input to a second portion 720 of the signal chain 700. The second portion 720 may include processing color mapping 722 back to the red-clear-green color space from the new color space, linearization 724 of the image data, tone mapping 726 (to obtain a consistent color balance across entire dynamic range), and color mapping 728 into a color space suitable for display, recording, or other intended use by a human observer (e.g., a color space such as sRGB or YUV). The output of the ISP may be coupled to a processor or memory, and may be transmitted through a wireless communication system such as that of FIG. 3.

FIG. 7A is one example signal processing chain, but other processing chain configurations may be used to process the image data. FIG. 7B is a block diagram illustrating an image signal processing system according to one or more aspects of the disclosure. A first portion 740 of signal chain 730 may include linearization 742 of the logarithmic data (or another predefined gray level mapping) of the input signal, local tone mapping 744 (to obtain consistent color balance across an entire dynamic range of the image signal), bit depth reduction, demosaicing 746, color mapping 748 according to a specifically-tuned color space (e.g., by color matrix mapping into spectral eigenmodes of the system), tone mapping 749, and/or gamma adjustment. A second portion 750 of signal chain 730 may include tone mapping 752, color mapping 754 into a color space suitable for display, recording, or other intended use by a human observer (e.g., a color space such as sRGB or YUV), and/or tone mapping 756.

FIG. 7A and FIG. 7B show a series of sequential processing steps performed on image data received from the image sensor or derived from data received from the image sensor. Certain processing in the image signal processing system may be performed in parallel. FIG. 7C is a block diagram illustrating an image signal processing system according to one or more aspects of the disclosure. FIG. 7C shows a similar processing chain as FIG. 7A, but the input to the second portion 720 is image data from the image sensor, rather than the output CV image from the first portion 710. In one or more additional aspects, the block diagram of FIG. 7C can likewise be implemented using input from the image sensor to the second portion 740. In one or more additional aspects, different arrangements of portions of the first portion and second portion are configured to provide different combinations of parallel operations.

Figure 8:
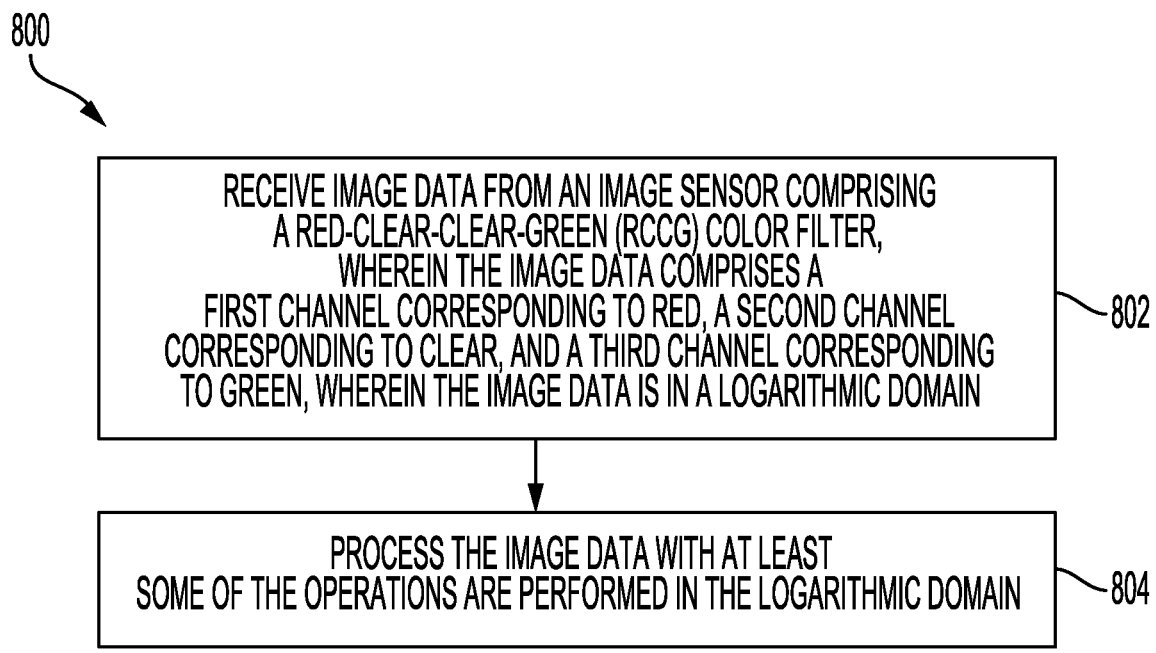
FIG. 8 is a flow chart illustrating an example method for obtaining image data for a vehicle monitoring system.

One method of performing image processing according to embodiments described above is shown in FIG. 8. FIG. 8 is a flow chart illustrating an example method for obtaining image data for a vehicle monitoring system. A method 800 includes, at block 802, receiving image data from an image sensor comprising a red-clear-clear-green (RCCG) color filter, wherein the image data comprises a first channel corresponding to red, a second channel corresponding to clear, and a third channel corresponding to green, wherein the image data is in a logarithmic domain. At block 804, the image data is processed by performing operations including linearization, tone mapping, demosaicing, and color mapping. In certain embodiments, at least some of the processing at block 804 may be in the logarithmic domain. In certain embodiments, before block 802, the ISP may configure a camera module comprising the image sensor with a programmable lookup table for a piecewise linear function to configure the image sensor for output in the logarithmic domain.

It is noted that one or more blocks (or operations) described with reference to FIG. 5 may be combined with one or more blocks (or operations) described with reference to another of the figures. For example, one or more blocks (or operations) of FIG. 8 may be combined with one or more blocks (or operations) of FIG. 4. As another example, one or more blocks associated with FIG. 8 may be combined with one or more blocks associated with FIG. 5. As another example, one or more blocks associated with FIG. 8 may be combined with one or more blocks (or operations) associated with FIGS. 6-7. Additionally, or alternatively, one or more operations described above with reference to FIGS. 1-3 may be combined with one or more operations described with reference to FIGS. 4-8.

In one or more aspects, techniques for supporting vehicular operations may include additional aspects, such as any single aspect or any combination of aspects described below or in connection with one or more other processes or devices described elsewhere herein. In a first aspect, supporting image processing, such as for vehicular monitoring operations, may include an apparatus comprising one or more of a camera module comprising a lens, an image sensor, a color filter array (CFA); and an image signal processor (e.g., a processor). Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, receiving image data from an image sensor comprising a red-clear-clear-green (RCCG) color filter, wherein the image data comprises a first channel corresponding to red, a second channel corresponding to clear, and a third channel corresponding to green, wherein the image data is in a logarithmic domain; and processing the image data by performing operations including linearization, tone mapping, demosaicing, and color mapping.

In a third aspect, in combination with one or more of the first aspect or the second aspect, the apparatus is also configured to perform operations including configuring the image sensor with a programmable lookup table for a piecewise linear function to configure the image sensor for output in the logarithmic domain.

In a fourth aspect, in combination with one or more of the first aspect through the third aspect, at least some of the operations are performed in the logarithmic domain.

In a fifth aspect, in combination with one or more of the first aspect through the fourth aspect, processing the image data comprises: demosaicing the image data to obtain demosaiced data; and color mapping the demosaiced data to second image data.

In a sixth aspect, in combination with one or more of the first aspect through the fifth aspect, processing the image data further comprises: linearizing the second image data to obtain linearized data; and color mapping the linearized data to obtain an output image frame in an RGB or YUV color space.

In a seventh aspect, in combination with one or more of the first aspect through the sixth aspect, processing the image data comprises: linearizing the image data to obtain linearized data; demosaicing the linearized data to obtain demosaiced data; and color mapping the demosaiced data to second image data.

In an eighth aspect, in combination with one or more of the first aspect through the seventh aspect, processing the image data further comprises color mapping and tone mapping based on the second image data to obtain an output image frame in an RGB or YUV color space.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:
receiving image data from an image sensor comprising a red-clear-clear-green (RCCG) color filter, wherein the image data comprises a first channel corresponding to red, a second channel corresponding to clear, and a third channel corresponding to green, and wherein a first portion of the image data is in a logarithmic domain and a second portion of the image data is in a linear domain, the first and second portions corresponding to different ones of the first to third channels; and
processing the image data by performing operations including demosaicing and color mapping, wherein at least some of the operations are performed in the logarithmic domain on the first channel and the second channel and at least some of the operations are performed in the linear domain on the third channel.

2. The method of claim 1, further comprising configuring the image sensor with a programmable lookup table for a piecewise linear function to configure the image sensor for output in the logarithmic domain.

3. The method of claim 1, wherein processing the image data comprises:
demosaicing the image data to obtain demosaiced data; and
color mapping the demosaiced data to second image data.

4. The method of claim 3, wherein processing the image data further comprises:
linearizing the second image data to obtain linearized data; and
color mapping the linearized data to obtain an output image frame in an RGB or YUV color space.

5. The method of claim 1, wherein processing the image data comprises:
linearizing the image data to obtain linearized data;
demosaicing the linearized data to obtain demosaiced data; and
color mapping the demosaiced data to second image data.

6. The method of claim 5, wherein processing the image data further comprises color mapping and tone mapping based on the second image data to obtain an output image frame in an RGB or YUV color space.

7. An apparatus, comprising:
a memory storing processor-readable code; and
at least one processor coupled to the memory, the at least one processor configured to execute the processor-readable code to cause the at least one processor to perform operations including:
receiving image data from an image sensor comprising a red-clear-clear-green (RCCG) color filter, wherein the image data comprises a first channel corresponding to red, a second channel corresponding to clear, and a third channel corresponding to green, and wherein a first portion of the image data is in a logarithmic domain and a second portion of the image data is in a linear domain, the first and second portions corresponding to different ones of the first to third channels; and
processing the image data by performing operations including demosaicing and color mapping, wherein at least some of the operations are performed in the logarithmic domain on the first channel and the second channel and at least some of the operations are performed in the linear domain on the third channel.

8. The apparatus of claim 7, wherein the at least one processor is further configured to perform operations including:
configuring the image sensor with a programmable lookup table for a piecewise linear function to configure the image sensor for output in the logarithmic domain.

9. The apparatus of claim 7, wherein processing the image data comprises:
demosaicing the image data to obtain demosaiced data; and color mapping the demosaiced data to second image data.

10. The apparatus of claim 9, wherein processing the image data further comprises:
   linearizing the second image data to obtain linearized data; and
   color mapping the linearized data to obtain an output image frame in an RGB or YUV color space.

11. The apparatus of claim 7, wherein processing the image data comprises:
   linearizing the image data to obtain linearized data;
   demosaicing the linearized data to obtain demosaiced data; and
   color mapping the demosaiced data to second image data.

12. The apparatus of claim 11, wherein processing the image data further comprises color mapping and tone mapping based on the second image data to obtain an output image frame in an RGB or YUV color space.

13. A non-transitory computer-readable medium storing instructions that, when executed by a processor, cause the processor to perform operations comprising:
   receiving image data from an image sensor comprising a red-clear-clear-green (RCCG) color filter, wherein the image data comprises a first channel corresponding to red, a second channel corresponding to clear, and a third channel corresponding to green, and wherein a first portion of the image data is in a logarithmic domain and a second portion of the image data is in a linear domain, the first and second portions corresponding to different ones of the first to third channels; and
   processing the image data by performing operations including demosaicing and color mapping, wherein at least some of the operations are performed in the logarithmic domain on the first channel and the second channel and at least some of the operations are performed in the linear domain on the third channel.

14. The non-transitory, computer-readable medium of claim 13, wherein the operations further comprise:
   configuring the image sensor with a programmable lookup table for a piecewise linear function to configure the image sensor for output in the logarithmic domain.

15. The non-transitory, computer-readable medium of claim 13, wherein processing the image data comprises:
   demosaicing the image data to obtain demosaiced data; and
   color mapping the demosaiced data to second image data.

16. The non-transitory, computer-readable medium of claim 15, wherein processing the image data further comprises:
   linearizing the second image data to obtain linearized data; and
   color mapping the linearized data to obtain an output image frame in an RGB or YUV color space.

17. The non-transitory, computer-readable medium of claim 13, wherein processing the image data comprises:
   linearizing the image data to obtain linearized data;
   demosaicing the linearized data to obtain demosaiced data;
   color mapping the demosaiced data to second image data; and
   color mapping and tone mapping based on the second image data to obtain an output image frame in an RGB or YUV color space.

* * * * *